Figure 1:
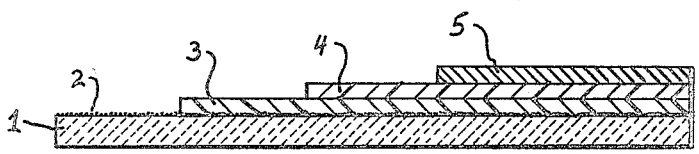

Jan. 26, 1965   W. J. FREMUTH   3,167,677
ELECTROLUMINESCENT DEVICE
Filed Dec. 16, 1960

INVENTOR.
WINFRIED JOSEF FREMUTH
BY

3,167,677
ELECTROLUMINESCENT DEVICE
Winfried J. Fremuth, Stamford, Conn., assignor to American Cyanamid Company, New York, N.Y., a corporation of Maine
Filed Dec. 16, 1960, Ser. No. 76,190
6 Claims. (Cl. 313—108)

The present invention is concerned with electro-luminescent devices. More particularly, it contemplates a novel, unitary, multi-layer structure comprising two or more electrically conductive surfaces having interposed therebetween a novel phosphor-containing, multi-layer dielectric structure.

An electroluminescent device, such as those contemplated by the present invention, is basically a simple structure. In essence, such a device is comprised of two electrodes, at least one of which transmits light, between which a phosphor is embedded in a suitable matrix.

One critical requirement for a suitable matrix is that it have a high dielectric constant [S. Roberts, J. Opt. Soc. Am. 42, 850 (1952)]. Among the dielectric matrices for electroluminescent phosphors that have been suggested are the ethers of cellulose, for example in U.S. Patents 2,774,004, 2,792,447, 2,918,594 and 2,901,652. The latter, in particular, suggests certain types of cyanoethylated cellulose as a preferred material of high dielectric constant.

Cellulose, both natural and regenerated, has been reacted with acrylonitrile in various ways to produce cyanoethylated derivatives. Physical properties of the resultant products vary with the nature of the cellulose, its molecular weight, the method of treatment and the like. However, it is effected most noticeably by the extent to which it has been cyanoethylated.

This latter usually is defined in one of two ways, either by a nitrogen analysis, expressed in weight percent; or by a decimal fraction representing the number of cyanoethyl groups introduced per anhydroglucose unit. This decimal fraction usually is referred to as the "degree of substitution." For purposes of simplification, in this discussion the latter will be abbreviated as DS. Both terminologies are used in this specification. Complete cyanoethylation corresponds to a nitrogen content of about 13.1 percent nitrogen and a DS of three.

At low degrees of substitution, i.e., a DS up to about two, cyanoethylation of cellulose does not greatly alter its physical appearance, the fibrous characteristics being largely retained. However, as higher DS values are produced, the characteristics of the product begin to change. As the DS increases above about two, the loss of fibrous characteristics and the resemblance of the product to a thermoplastic becomes increasingly noticeable. Moreover, the product begins to become soluble in certain organic solvents.

These characteristics begin to become dominant in products having a DS above about 2.3 which correspond approximately to nitrogen content percentages of from about 11.4 or 11.5 up to somewhat over 13. It is with products of this highly-cyanoethylated type with which the present invention is particularly concerned. Again for purposes of simplification, in this discussion such products will be referred to using the abbreviation "HCC." Such products, particularly those having a DS above about 2.5, have very desirable electrical characteristics for a number of purposes. Among these are a high dielectric constant and a relatively low dissipation factor.

To be wholly satisfactory for such purposes, the matrix must have a dielectric constant of at least about nine, preferably from about eleven to about fourteen. To attain this value in HCC ordinarily requires a DS of about 2.5, or higher, corresponding to a nitrogen content of at least about 12.1 percent. It is also clear that the dissipation factor should be as low as possible since it represents waste of electrical energy into unwanted heat. The dissipation factor should be below about 0.028 and preferably below about 0.025. This, in turn, requires that the HCC, to be suitable for the purpose, must be free from ionic impurities to a high degree. Its content of such impurities should not exceed about not over 200 parts per million and preferably not more than about 50 p.p.m. In addition, such products should be substantially water-white.

Unfortunately, the proposed use of HCC of a grade which exhibits the combination of desired electrical properties and lack of color in electroluminescent devices is subject to one serious defect. The degree of adhesion of such HCC to a conductive coating on a suitable transparent or translucent electrode is low and in general is therefore unsatisfactory. Such an electrode is typically a glass sheet or some physically equivalent transparent or translucent non-conductor having a conductive coating imbedded in one surface. A typical coating will consist of a tin oxide film (U.S. Patent 2,838,715) or its equivalent.

In order to obtain the desired electrical contact, the minimum adhesion of a phosphor-containing matrix to a conductive coating must be sufficient to insure that the matrix film will not spontaneously peel from the conductive surface during the drying of the film which follows the casting of a suitable solution onto conductive surface of the electrode. While the desired quality grade of HCC exhibits adequate adhesion to plain glass, or its equivalent, it frequently is found unsatisfactory when films are cast on a layer of tin oxide or its equivalent which comprises the electrode surface on the so-called "conductive glass." This problem becomes even more aggravated when the phosphor is present in the HCC.

Furthermore, the film obtainable using a suitable grade of HCC often is less strong than is desirable. While the weakness of the film is not as serious a drawback, as its poor adhesion, it can be said that any improvement here, especially if not at the expense of the electrical properties, will also be desirable, particularly so in flexible electroluminescent panels such as shown in U.S. Patent 2,774,004.

It is, therefore, a principal object of the present invention to develop an HCC matrix composition suitable for use for such dielectric purposes as the preparation of phosphor-bearing matrices and the like without being subject to the noted mechanical difficulties of poor adhesion and relatively low strength. This has been accomplished in relatively simple but surprisingly successful manner.

In general, the desired result is accomplished by forming a multilayer phosphor matrix. The layer adjacent to the conductive surface of the glass contains between about forty and about ninety-nine percent HCC and from about one to about sixty percent of cyanoethylated polyvinyl alcohol. The latter, for purposes of simplification, is hereinafter noted by the abbreviation "CPVA."

It is quite surprising that the inclusion of even as little as about one percent of CPVA in the final cyanoethylated composition is helpful in obtaining the desired result. Two percent produces a very marked improvement. Usually, however, from about two to about forty percent will be used to produce the desired result with the use of some ten to thirty percent comprising a good practice.

It might be expected from these results that it would be desirable to form the entire matrix of this composition. Unfortunately, this too is not satisfactory. In general the dissipation factor of CPVA itself as well as mixtures thereof with HCC are not as good as that of a better grade of HCC alone. I have found that the HCC-CPVA layer not only bonds satisfactorily to the conductive-glass surface but equally well to a matrix layer of phosphor-containing HCC.

Accordingly, the HCC-CPVA layer mentioned above, in the present invention is present as only a thin layer comprising in most cases a minor portion of the total matrix thickness. Thereover is formed a thicker phosphor-containing layer of the best obtainable grade of HCC. This layer, whether cast as one film or built up as a series of thinner layers, a procedure I find generally preferable, forms with the conductive glass and the HCC-CPVA layer a firmly adherent unitary whole.

Finally, over the top of the HCC layer is placed the second electrode. This may be a sheet of metal, usually aluminum. Preferably, however, as shown in the various references noted above, this electrode is formed by metallizing the upper surface of the HCC layer. This metallizing may be done by any of several procedures well known in the art and the particular method utilized forms no part of the present invention.

Application of a suitable alternating current, through conventional conductors, to the two electrodes results in energizing the phosphor disseminated through the matrix and light is transmitted through and emitted by the transparent surface.

Figure 2:
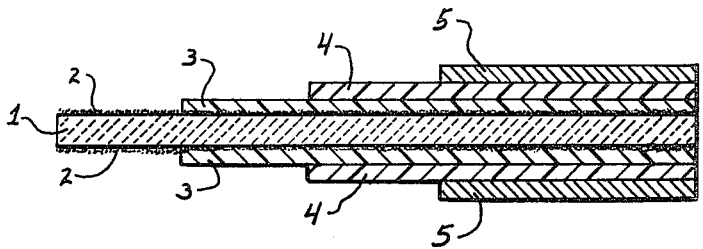

This invention will be described more fully in conjunction with the accompanying drawings in which:

FIGURE 1 is a conventionallized cross-section through a typical structure of the present invention and intended to emit light from one side; and FIGURE 2 is also a cross-section, also conventionalized, of a similar structure intended to emit light from both surfaces.

As may be seen in FIGURE 1, the structure comprises a glass layer 1, having a conventional imbedded conductive surface layer 2 of tin oxide or its equivalent. Directly in contact with the conductive layer 2, is the HCC-CPVA layer 3. This layer will generally be from about 0.1 to about one mil in thickness. Immediately above, and in intimate adherent contact with layer 3 is the thicker layer 4 of phosphor-containing HCC. Layer 4 is ordinarily from about one to about two mils in thickness. However, it can be somewhat more or somewhat less, if so desired. Finally, on the upper surface of layer 4 is the metallized second electrode 5 of aluminum or other suitable metal.

As seen in FIGURE 2, the same layers of FIGURE 1 may be seen. However, the metallized electrode 5 constitutes the central layer and on it are built up in reverse order the HCC layer 4; the HCC-CPVA layer 3 in contact with the conductive surface 2 of the conductive glass 1.

It is believed the mode of operation is apparent from the foregoing description. HCC of suitable quality for the purpose is commercially available. It may be obtained from any desired source. Compositions suitable for use in the HCC-CPVA layer may be made or purchased as may be preferred by the user.

Both film layers may be formed from suitable solution. Solutions of adequately high concentration and sufficiently low viscosity are necessary. Solvents are not common which enable the formation of such solutions containing from ten to twenty weight percent dissolved content without the solution being excessively viscous. A good preferred practice is use solutions of some ten to fifteen percent concentration. With this content, a viscosity averaging about 1500 centipoises will be found good practice. For the present purposes, use of acetronitrile is the preferred solvent. This use does not form part of the present invention but constitutes a part of the subject matter of the copending application of K. W. Saunders and N. M. Bikales, Serial No. 76,190, filed December 16, 1960 which is assigned to the common assignee. The invention is not meant to be limited thereto and any desired solvent such as acetone, dimethyl formamide, pyridine and the like or mixtures of them may be used if so desired.

Any suitable phosphor may be used. In this discussion zinc sulfide will be used as illustrative. It is to be understood however that any phosphor available may be substituted therefore. Some are noted in the patents cited above. Several are commercially available.

As to the amount of phosphor which should be used in forming the several layers of the matrix in forming the structure of the present invention, it will be found to vary with the intended purpose. A good general practice is to employ from about forty to about one hundred and fifty weight percent of the weight of the HCC-CPVA mixture in the film-forming solution. Usually some 100 to 130 percent will be found to constitute a good practice. It should be as finely-divided as practicable and should be thoroughly dispersed through the solution before casting the film or films for the matrix. This practice is well understood by those skilled in the art.

Spreading of the phosphor-bearing solution on the surface to be treated may also be done in any conventional manner. Procedures such as flowing, casting, spraying or doctoring are well understood in the art. The exact procedure used forms no critical part of the present invention so long as it is capable of producing a good, uniform layer. After casting, which will be used herein as a generic designation for the solution application procedure, the film is dried.

So far as is practicable, each layer should be fully dried before application of the next layer. One suitable, but rather slow, drying practice is to hold the film at about 40° C. This may be increased or decreased somewhat in accordance with the solvent being used. Another good practice is to hold the film in an infra-red drying oven for some fifteen minutes followed by about one hour at some 100°–130° C. It is good economic practice, though not a limitation on the invention to conduct the drying in some conventional apparatus equipped to recover the solvent evaporated from the film.

In general, as noted above, it is desirable that the thickness of the HCC-CPVA layer be minimized. For this reason it will usually be less than the one mil maximum thickness discussed above. Therefore while not essential, if this layer is to be less than about 0.3 mil thickness, it is usually convenient to cast this layer of the composite structure as one operation. Above about 0.5 mil it is usually more convenient and permits more efficient drying if this layer is cast as two or more operations.

Similarly, it is possible but not desirable to cast the HCC layer in a single operation. Preferably, however, it will be cast in a multiple operation, each designed to produce a film after drying which will be some 0.1 to about 0.3 mil in thickness.

The invention will be more fully illustrated by the following illustrative examples in which all parts and percentages are by weight and temperatures are in degrees centigrade, unless otherwise noted.

*Example 1*

A sample of CPVA having a nitrogen analysis of about 12.1, a dielectric constant of about 12.6 and a dissipation factor of about 0.043 is combined in weight ratio of about 1:3 with HCC having a nitrogen analysis of about 12.5, a dielectric constant of about 12 and a dissipation factor of about 0.013. About ten parts of mixture of CPVA and HCC is dissolved up in about ninety parts of acetonitrile and the solution is filtered under pressure. In the following examples, this is referred to as Solution A.

*Example 2*

About 10 parts of an additional sample of the same HCC is dissolved in about 90 parts of acetonitrile and the solution is filtered under pressure. In the following examples this solution is referred to as Solution B.

Example 3

About 12.8 parts by weight of finely-divided zinc sulfide phosphor is combined with and thoroughly admixed in about 100 parts of each of Solutions A and B. The resultant dispersions are referred to in the following examples as Dispersion A and Dispersion B respectively.

Example 4

A sufficient amount of Solution A and Solution B respectively, to form a film having a dry thickness of about 2 mils, is cast on the conductive surface of each of two "conductive glass" sheets. This conductive surface is comprised essentially of tin oxide and has a resistance of about 100 ohms per square. Such glass is described in "Materials and Methods," August 1956. The cast films were dried for about 12 hours at 40° C., then for 1 hour at about 130° C. and finally for about 24 hours at room temperature under high vacuum over $P_2O_5$. The dried films were then conditioned at about 23° C. and 50% relative humidity for several days. Thereafter the strength of the adhesive bond to the glass is measured by peeling off 1″ wide films at an angle of 180° C. using a commercially-available Instrom instrument. The film cast from Solution B had an adhesion of about 2.5 gm. per inch of width; that from Solution A about 11.0 gm. This test clearly shows the marked increase in adhesive strength of the film from Solution A to the conductive glass surface.

Example 5

A thin layer of Solution A is cast on the surface of a sample of the conductive glass of Example 4. The cast film is dried for about 10 minutes under infrared heating and then for about 3 hours at about 120° C. This operation is again repeated. After the second drying, the film thickness is about 0.3 mil. Thereover, a film of Solution B is cast and dried. This operation is repeated until the total dried film thickness is about 2 mils. At no time in the several drying steps do the films being dried show any tendency to separate from the supporting layer of conductive glass.

Example 6

A conductive glass plate is coated on the conductive side with Dispersion A and then with Dispersion B according to the procedure of Example 5, the dispersions being substituted for the solutions of that example. A sufficient amount of Dispersion A and Dispersion B is deposited to provide films of substantially the same thickness as in Example 5. The upper surface of the layer deposited from Dispersion B is then metallized by vacuum evaporation of aluminum. One conductor is attached to the conductive glass surface and another to the metallized layer and an alternating current at about 60 cycles and about 115 volts is applied thereto. Soft light of even brightness is emitted from the whole of the glass surface.

I claim:
1. In an integrated electroluminescent structure characterized by:
   (1) a first electrically-conductive layer;
   (2) a second electrically-conductive layer; at least one of said first and second layers being light conductive; said first and second layers being insulated from electrical contact by,
   (3) an interposed unitary multi-layer phosphor-bearing dielectric layer in unitary contact with both, and bonded to at least one of, said first and second electrically-conductive layers; the improvement wherein said multi-layer dielectric layer comprises:
   (a) a first film-layer in adhesive contact with, and bonded to, said first electrically-conductive layer, said first film-layer essentially comprising a phosphor uniformly dispersed throughout a film having a major proportion of cyanoethylated cellulose and a minor proportion of cyanoethylated polyvinyl alcohol; and
   (b) a second film layer superimposed on, and bonded to, said first film-layer, said second film-layer essentially comprising cyanoethylated cellulose having a phosphor uniformly dispersed therethrough.

2. A structure according to claim 1 in which both the cyanoethylated cellulose and the cyanoethylated polyvinyl alcohol have a nitrogen content of at least 12%.

3. A structure according to claim 1 in which both the cyanoethylated cellulose and the cyanoethylated polyvinyl alcohol have a dielectric constant of at least about 9.

4. A structure according to claim 1 in which both the cyanoethylated cellulose and the cyanoethylated polyvinyl alcohol have a dissipation factor below about 0.03.

5. A structure according to claim 1 in which the film layer containing both cyanoethylated cellulose and cyanoethylated polyvinyl alcohol contains from about two to about 40 weight percent of cyanoethylated polyvinyl alcohol and from about 60 to about 98 weight percent of cyanoethylated cellulose.

6. A structure according to claim 1 in which the ratio of the relative thicknesses of the mixed cyanoethylated layer to the cyanoethylated-cellulose layer is from about 1:19 to about 1:1.

References Cited in the file of this patent

UNITED STATES PATENTS

| | | |
|---|---|---|
| 2,733,367 | Gillson | Jan. 31, 1956 |
| 2,920,256 | Lewis | Jan. 5, 1960 |
| 2,951,865 | Jaffe | Sept. 6, 1960 |

UNITED STATES PATENT OFFICE
CERTIFICATE OF CORRECTION

Patent No. 3,167,677            January 26, 1965

Winfried J. Fremuth

It is hereby certified that error appears in the above numbered patent requiring correction and that the said Letters Patent should read as corrected below.

Column 3, line 73, for "Serial No. 76,190, filed December 16, 1960" read -- Serial No. 67,457, filed November 7, 1960, now U.S. Patent 3,097,956 --.

Signed and sealed this 1st day of June 1965.

(SEAL)
Attest:

ERNEST W. SWIDER            EDWARD J. BRENNER
Attesting Officer            Commissioner of Patents